US006397693B1

(12) United States Patent
Umemoto et al.

(10) Patent No.: US 6,397,693 B1
(45) Date of Patent: Jun. 4, 2002

(54) CHANGE SPEED APPARATUS FOR A TRACTOR

(75) Inventors: Tomeo Umemoto, Osaka; Masatoshi Iwamoto, Kaizuka, both of (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/520,707

(22) Filed: Mar. 7, 2000

(30) Foreign Application Priority Data

Jul. 15, 1999 (JP) .......................................... 11-202195
Jul. 15, 1999 (JP) .......................................... 11-202196
Jul. 15, 1999 (JP) .......................................... 11-202198

(51) Int. Cl.$^7$ ............................ F16H 3/08; F16H 57/02
(52) U.S. Cl. .............................. 74/333; 74/359; 74/360; 74/606 A
(58) Field of Search ..................... 74/745, 360, 333, 74/359, 361, 606 R

(56) References Cited

U.S. PATENT DOCUMENTS

| | | | | |
|---|---|---|---|---|
| 2,777,332 A | * | 1/1957 | Nallinger ................... | 74/360 X |
| 2,825,232 A | * | 3/1958 | Sieving et al. ............. | 74/359 X |
| 2,881,627 A | * | 4/1959 | Hubert et al. .............. | 74/360 |
| 3,348,644 A | * | 10/1967 | Hilpert ...................... | 74/360 X |
| 3,858,455 A | * | 1/1975 | Sison et al. ................. | 74/360 |
| 3,893,345 A | * | 7/1975 | Sisson et al. .............. | 74/360 X |
| 4,094,206 A | * | 6/1978 | Sogo et al. .................. | 74/360 |
| 4,132,133 A | * | 1/1979 | Ballendux ................... | 74/745 |
| 4,686,869 A | * | 8/1987 | Beim .......................... | 74/745 |
| 4,833,933 A | * | 5/1989 | Lomas et al. ............... | 74/359 |
| 4,848,176 A | * | 7/1989 | Daloz ........................ | 74/360 X |
| 5,901,606 A | | 5/1999 | Umemoto et al. | |

OTHER PUBLICATIONS

Japanese Patent Laying–Open Publication H11–78560.
Partial Translation of H11–78560.
Japanese Patent Publication H8–1221.

* cited by examiner

Primary Examiner—Charles A Marmor
Assistant Examiner—Ha Ho
(74) Attorney, Agent, or Firm—Webb Ziesenheim Logsdon Orkin & Hanson, P.C.

(57) ABSTRACT

A change speed apparatus for a tractor includes a main change speed device (24) having a combination of gear trains mounted on a first shaft and a second shaft extending parallel to each other, for driving a change speed output shaft (58) at a plurality of speeds, and a backward and forward drive switching device (21) cooperable with the main change speed device (24) to produces forward drive and backward drive in an equal number of speeds. Between the main change speed device (24) and the backward and forward drive switching device (21), the forward drive is transmitted through the first shaft (45) and the backward drive is transmitted through the second shaft (44). With this construction, a group of gears for returning reversed drive to a forward drive transmission shaft is omitted from the backward and forward drive switching device (21). Consequently, the backward and forward drive switching device has a reduced fore and aft length, and thus the entire change speed apparatus also has a reduced fore and aft length.

8 Claims, 7 Drawing Sheets

CHANGE SPEED APPARATUS FOR A TRACTOR

BACKGROUND OF THE INVENTION

1. Technical Field of the Invention

This invention relates to a change speed apparatus for a tractor. More particularly, the invention relates to a change speed apparatus for a tractor having a main change speed device with a combination of gear trains mounted on a first shaft and a second shaft extending parallel to each other for producing a plurality of speeds on an output shaft, and a backward and forward drive switching device cooperable with the main change speed device to produce forward drive and backward drive in the same number of speeds.

2. Prior Art of the Invention

When carrying out a front loading operation with a tractor, switching between forward driving and backward driving has to be made frequently. To perform this operation efficiently, it is desirable that the tractor is driven forward and backward substantially at the same speed. A known change speed apparatus for a tractor that meets the above requirement includes a backward and forward drive switching device as described in Japanese Patent Laying-Open Publication H10-6792 or H11-78560, for example.

The conventional change speed apparatus for a tractor includes a main change speed device disposed in a transmission system for transmitting power from an engine to wheels. The main change speed device produces a plurality of drive speeds. A backward and forward drive switching device is disposed at an input side (upstream side) or an output side. (downstream side) of the main change speed device to provide forward drive and backward drive at the same speed.

Where, as shown in FIG. 8, for example, a backward and forward drive switching device 152 is disposed at an input side of a main change speed device 151, the power of an engine 153 is inputted to the backward and forward drive switching device 152 through a main clutch 154, to be switched to forward drive or backward drive. The drive is then inputted to an input shaft 155 of main change speed device 151 to be changed to one of four speeds, and outputted to an output shaft 156.

That is, the drive, whether forward or backward, is inputted to the main change speed device 151 through the same input shaft 155. For this purpose, the backward and forward drive switching device 152 includes a pair of gear trains 158 and 159 disposed forwardly and rearwardly of a backward and forward drive switching clutch 157. One of the gear trains is a reversing gear train 158 for providing backward rotation, and the other a back return gear train 159 for returning the backward rotation to the input shaft 155 of main change speed device 151.

The same concept of one input shaft and one output shaft has been applied also to the construction having the backward and forward drive switching device disposed at the output side (downstream side) of the main change speed device. That is, to provide backward drive, power received from the output shaft of the main change speed device is reversed by a reversing gear train disposed forwardly of a backward and forward drive switching clutch, and thereafter returned through a back return gear train disposed rearward of the drive switching clutch, to the same shaft used for transmitting forward drive.

However, each of the conventional change speed apparatus noted above has an increased fore and aft length since the backward and forward drive switching device includes two gear trains, i.e. the reversing gear train and return gear train, forwardly and rearwardly of the switching clutch. The increased fore and aft length of the change speed apparatus results in an increased distance between front wheels and rear wheels. This impairs the small turn performance of the tractor.

A primary object of this invention, therefore, is to provide a change speed apparatus for a tractor which has a reduced fore and aft length.

SUMMARY OF THE INVENTION

The above object is fulfilled, according to this invention, by a change speed apparatus for a tractor wherein, between the main change speed device and the backward and forward drive switching device, the forward drive is transmitted through the first shaft and the backward drive is transmitted through the second shaft.

By employing this construction, the conventional backward return gear train may be dispensed with. This not only reduces the number of components but reduces the fore and aft length of the change speed apparatus. The fore and aft length of the transmission case may be reduced correspondingly, which in turn reduces the wheelbase to improve the small turn performance of the tractor.

In this way, this invention provides a compact change speed apparatus for a tractor.

Where the backward and forward drive switching device is disposed upstream of the main change speed device, the forward drive is transmitted from the backward and forward drive switching device to the main change speed device through the first shaft, and the backward drive is transmitted from the backward and forward drive switching device to the main change speed device through the second shaft.

Some conventional tractors have no backward and forward drive switching device. The tractors with and those without the backward and forward drive switching device are regarded as different in specification and design, and thus as different models. This complicates control and management in designing, manufacture and maintenance. According to this invention, the backward and forward drive switching device and the main change speed device are disposed in a transmission case, the backward and forward drive switching device is pre-assembled in a gear case fixable to the transmission case. With this construction, only by assembling to the transmission case the gear case pre-assembled with the backward and forward drive switching device, a tractor without the backward and forward drive switching device may advantageously be converted into one having the backward and forward drive switching device.

According to this invention, the transmission case may be divided by a partition into a clutch chamber for housing a main clutch for connecting and disconnecting power from an engine, and a transmission chamber for housing the main change speed device, the gear case being disposed in the clutch chamber, the main clutch being operable by a release fork disposed between the main clutch and the gear case, the release fork being curved to bulge toward the main clutch. This construction reduces the distance between the main clutch and gear case, to make the change speed apparatus compact.

A conventional backward and forward drive switching device is disposed in the transmission chamber storing a lubricant for the transmission case, is therefore remote from a control lever disposed adjacent the steering wheel. It has been difficult to connect the switching device and the control lever, and a complicated connecting mechanism has been required. It is conceivable to place the backward and forward drive switching device in the clutch chamber close to the control lever. However, the clutch chamber is a dry chamber, and it is difficult to place, in the clutch chamber, the backward and forward drive switching device which needs lubrication. In this invention, the backward and forward drive switching device and the main change speed device may be disposed in a transmission case, and the transmission case is divided by a partition into a clutch chamber for housing a main clutch for connecting and disconnecting power from an engine, and a transmission chamber for housing the main change speed device, the backward and forward drive switching device having a control lever thereof disposed on a steering wheel unit, the control lever being interlocked to the backward and forward drive switching device through an operating shaft extending vertically in the clutch chamber. By employing such a construction, the control lever and the operating shaft are disposed close to each other, and may advantageously be interconnected by a simple connecting mechanism.

Other features, functions, effects and advantages of the present invention will be appreciated upon reading the following description with reference to the drawings.

DESCRIPTION OF THE PREFERRED EMBODIMENT

A preferred embodiment of this invention will be described hereinafter with reference to the drawings.

Figure 1:
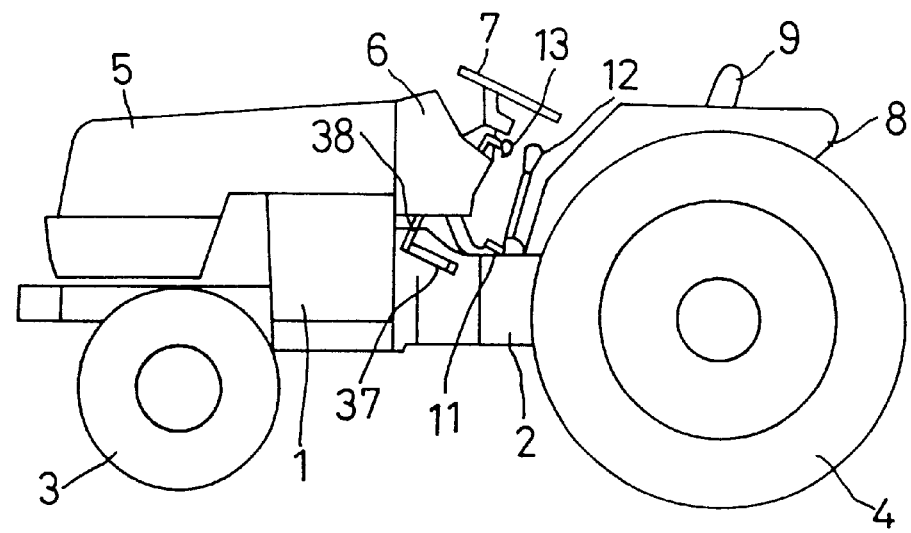
FIG. 1 is a side view of a tractor having a change speed apparatus according to this invention.
Figure 2:
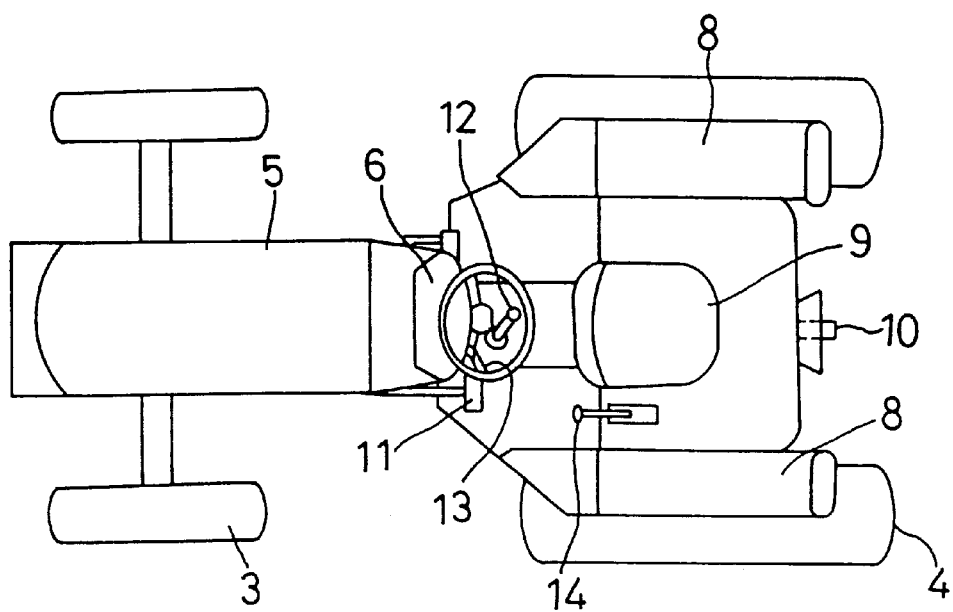
FIG. 2 is a plan view of the tractor shown in FIG. 1.

FIGS. 1 and 2 show a side view and a plan view of a tractor to which this invention is applied. The tractor includes a vehicle body having an engine 1 disposed in a forward portion thereof and a transmission case 2 fixed to the rear of engine 1. The vehicle body is supported by front wheels 3 and rear wheels 4. The engine 1 is covered by a hood 5. An instrument panel 6 and a steering wheel unit 7 are disposed rearwardly of the hood 5. The rear wheels 4 are covered by fenders 8. A driver's seat 9 is disposed between the right and left fenders 8. A PTO shaft (power takeoff shaft) 10 projects from the rear end of the vehicle body.

The transmission case 2 housing a transmission for transmitting power from the engine 1 to the rear wheels 4, front wheels 3 and PTO shaft 10. The transmission includes a change speed apparatus.

A clutch pedal 11 is disposed below the instrument panel 6 for engaging and disengaging a main clutch described later. The clutch pedal 11 is suspended to be pivotable forward and backward. A main shift lever 12 is disposed on an upper surface of transmission case 2 between the steering wheel unit 7 and driver's seat 9. The steering wheel unit 7 includes a backward and forward drive switching lever 13. An auxiliary shift lever 14 is disposed laterally of the driver's seat 9.

FIGS. 3 through 6 show the transmission case 2 and the transmission mounted therein. The transmission case 2 is divided by a first partition 15 into a clutch chamber 16 at the front and a transmission chamber 17 at the rear. The transmission chamber 17 has oil stored at a predetermined level therein for use as lubricant and hydraulic oil. A second partition 18 is disposed rearwardly of the transmission chamber 17.

The clutch chamber 16 includes a main clutch 19 and a gear case 20. The gear case 20 is fixed to the first partition 15. The gear case 20 contains a backward and forward drive switching device 21. The gear case 20 is divided into a front case 22 and a rear case 23.

The transmission chamber 17 contains a main change speed device 24 for providing four speeds, an auxiliary change speed device 25 for providing a high speed and a low speed, a creep change speed device 26 for providing a superlow speed, and a front wheel driving device 27. A rear wheel driving device and a PTO change speed device, not shown, are arranged rearwardly of the transmission case 2.

The main clutch 19 includes a flywheel 28 fixed to the rear end of a crankshaft of engine 1, a clutch disk 30 pressed by a pressure plate 29 to an end surface of flywheel 28, a diaphragm spring 31 for applying a pressing force to the pressure plate 29, and a release hub 32 for releasing the pressing force of spring 31.

The release hub 32 is mounted to be slidable fore and aft on a boss projecting from a front surface of the front case 22.

A PTO drive shaft 33 is directly connected to an axial position of the flywheel 28. The PTO drive shaft 33 extends rearward through the gear case 20 to be coupled to the PTO shaft 10 through the change speed device (not shown).

The main clutch 19 has a tubular driven shaft 34 extending rearward and acting also as a shuttle input shaft. The driven shaft 34 is coaxially mounted on the PTO drive shaft 33 to be rotatable relative thereto. The clutch disk 30 is fixed to the driven shaft 34. The driven shaft 34 is relatively rotatably supported at a forward end thereof by the flywheel 28 through a bearing. The driven shaft 34 is relatively rotatably supported in a rearward position thereof by the front case 22 through a bearing. The rear end of the driven shaft 34 is located in the gear case 20.

A clutch operating shaft 35 is supported by side walls of the clutch chamber 16 to be rotatable about an axis extending transversely of the vehicle body. A main clutch release fork 36 is fixed to the clutch operating shaft 35. Bifurcated ends of the fork 36 are engaged with the release hub 32. The fork 36 is disposed between the main clutch 19 and gear case 20, and is curved to bulge toward the main clutch 19. One end portion of the clutch operating shaft 35 projects from the clutch chamber 16, and the clutch pedal 11 (FIG. 2) is connected to the projecting end portion through a clutch lever 37 and a clutch rod 38.

A conventional release fork is curved to bulge rearward. With the release fork 36 curved to bulge forward, the release fork 36 does not interfere with the gear case 20. This construction realizes a reduction in the distance between the main clutch 19 and gear case 20. As a result, the transmission has a reduced fore and aft length.

The main clutch 19 normally transmits the power of engine 1 to the driven shaft 34 through the clutch disk 30.

The break this power transmission, the driver depresses the clutch pedal 11. A depression of the clutch pedal 11 rotates the clutch operating shaft 35 through the clutch rod 38 and clutch lever 37. This rotation swings the main clutch release fork 36, which in turn moves the release hub 32 forward to push the diaphragm spring 31, thereby canceling its pressing force. Thus, the power transmission to the clutch disk 30 is broken to place the driven shaft 34 in a free state.

The backward and forward drive switching device 21 is placed, by way of sub-assembly, inside the gear case 20 consisting of the front case 22 and rear case 23, and then the two cases are provisionally integrated by bonding the mating surfaces thereof with an adhesive. Subsequently, the gear case 20 is fixed to the first partition 15 with common bolts 39. This construction realizes an improved efficiency of assembly.

The backward and forward drive switching device 21 in the gear case 20 has a backward and forward drive switching clutch 40 mounted on the rear end of the driven shaft 34 of main clutch 19. A backward drive gear 41 is freely rotatably mounted on the driven shaft 34 forwardly of the clutch 40. A reversing intermediate gear 42 is meshed with the backward drive gear 41. A backward drive input gear 43 is meshed with the intermediate gear 42. The backward drive input gear 43 has a boss projecting forward. The boss is rotatably supported at an outer circumference thereof by the front case 22 through a bearing. The backward drive input gear 43 defines a splined axial bore. A backward drive input shaft 44 is removably inserted into the splined bore for spline engagement. The backward drive input shaft 44 extends parallel to the driven shaft 34. The backward drive input shaft 44 is rotatably supported by the rear case 23 through a bearing to extend rearward and have a rear end thereof supported by the second partition 18 through a bearing.

With the backward drive input shaft 44 removably inserted into the backward drive input gear 43, the backward and forward drive switching device 21 may be placed in the gear case 20 by way of sub-assembly.

A forward drive input shaft 45 is disposed rearwardly of the switching clutch 40 and coaxially with the driven shaft 34 and a coaxial core. The forward drive input shaft 45 is rotatably supported by the rear case 23 through a bearing. The forward drive input shaft 45 is a tubular shaft mounted on the PTO drive shaft 33 to be rotatable relative thereto.

The backward and forward drive switching clutch 40 is a synchromesh clutch as disclosed in Japanese Patent Publication H8-1221, for example. The switching clutch 40 has a hub 46 mounted on the rear end of driven shaft 34 to be rotatable therewith, a shifter 47 mounted on the hub 46 not to be rotatable but axially movable relative thereto, and synchronizing rings (not shown) disposed forwardly and rearwardly of the hub 46. The backward drive gear 41 has an engaging portion 48 for engagement with the shifter 47 through one of the synchronizing rings. The forward drive input shaft 45 also has an engaging portion 49 for engagement with the shifter 47 through the other synchronizing ring.

The shifter 47 is engaged with the shift fork 50. The shift fork 50 is attached, to be pivotable fore and aft, to a rod 51 fixed between the front case 22 and rear case 23 of the gear case 20.

The front case 22 has a forwardly bulging projection 52 formed in a lower portion thereof. A shift fork operating shaft 53 is pivotably supported in vertical posture by the projection 52 and the upper wall of transmission case 2. This operating shaft 53 is disposed rearwardly of the release fork 36 of main clutch 19 and forwardly of the shifter 47 of backward and forward drive switching device 21. The operating shaft 53 is vertically divided into an upper shaft portion 54 and a lower shaft portion 55 separably interconnected through a coupling 56. The lower shaft portion 55 has a yoke 57 fixed thereto in the projection 52. The distal end of yoke 57 is engaged with the shift fork 50. The upper shaft portion 54 has an upper end thereof projecting upward from the upper surface of transmission case 2. The backward and forward drive switching lever 13 is connected to the projecting end through a link (not shown). An operation in the fore and aft direction of the backward and forward drive switching lever 13 attached to the steering wheel unit 7 rotates the operating shaft 53, which forwardly or rearwardly swings the yoke 57 attached to the lower end thereof. The swing of the yoke 57 moves the shift fork 50 forward or backward, which in turn moves the shifter 47 forward or backward.

The shifter 47 has a neutral position intermediate in the fore and aft direction. When the shifter 47 is moved forward from the neutral position to engage the engaging portion 48 of backward drive gear 41, power is transmitted from the driven shaft 34 to the backward drive input shaft 44 through the backward drive gear 41, intermediate gear 42 and backward drive input gear 43. Conversely when the shifter 47 is moved backward from the neutral position to engage the engaging portion 49 of forward drive input shaft 45, power is transmitted from the driven shaft 34 to the forward drive input shaft 45.

Since the shift fork operating shaft 53 is disposed in vertical posture, with the upper end connected to the backward and forward drive switching lever 13, the two components may be connected through a minimum distance. Further, since the operating shaft 53 is vertically divided into two parts, the lower shaft portion 55 may be incorporated into the gear case 20. This allows the backward and forward drive switching device 21 to form a sub-assembly with ease.

A tubular change speed output shaft 58 is relatively rotatably and coaxially mounted on the PTO drive shaft 33 in the transmission chamber 17. The change speed output shaft 58 is rotatably supported at a forward end thereof by an inner surface of the forward drive input shaft 45 through a needle bearing. The rear end of change speed output shaft 58 is rotatably supported by the second partition 18 of transmission case 2 through a bearing.

The main change speed device 24 for providing four speeds is disposed on the forward drive input shaft 45, backward drive input shaft 44 and change speed output shaft 58 in the transmission chamber 17.

Specifically, the backward drive input shaft 44 has, arranged from rear to front, a first speed gear 60 and a second speed gear 61 freely rotatably mounted thereon, and a third speed gear 62 and a fourth speed gear 63 fixed to the shaft 44. A first and second speed switching clutch 64 is disposed between the first speed gear 60 and second speed gear 61. This clutch 64 is a synchromesh clutch as is the backward and forward drive switching clutch 40.

The first and second speed switching clutch 64 has a hub 65 fixed to the backward drive input shaft 44, a shifter 66 axially movably mounted on the hub 65, and synchronizing ring (not shown) disposed forwardly and rearwardly of the hub 65. The first and second speed gears 60 and 61 have engaging portions 67 and 68 formed on inward ends thereof, respectively, for engagement with the shifter 66.

The change speed output shaft 24 has gears 69 and 70 fixed thereto and in constant mesh with the first and second speed gears 60 and 61. Further, the output shaft 24 has a gear 71 relatively rotatably mounted thereon and in constant mesh with the third speed gear 62.

The forward drive input shaft 45 has a gear 72 formed on a rear portion thereof and in constant mesh with the fourth speed gear 63. A third and fourth speed switching clutch 73, which is a synchromesh clutch, is disposed between the rear end of forward drive input shaft 45 and the third speed gear 71 on the change speed output shaft 58.

The third and fourth speed switching clutch 73 has a hub 74 fixed to the change speed output shaft 58, a shifter 75 axially movably mounted on the hub 74, and synchronizing ring (not shown) disposed forwardly and rearwardly of the hub 74. The rear end of forward drive input shaft 45 and the third speed gear 71 have engaging portions 76 and 77 formed on inward ends thereof, respectively, for engagement with the shifter 75.

Figure 7:
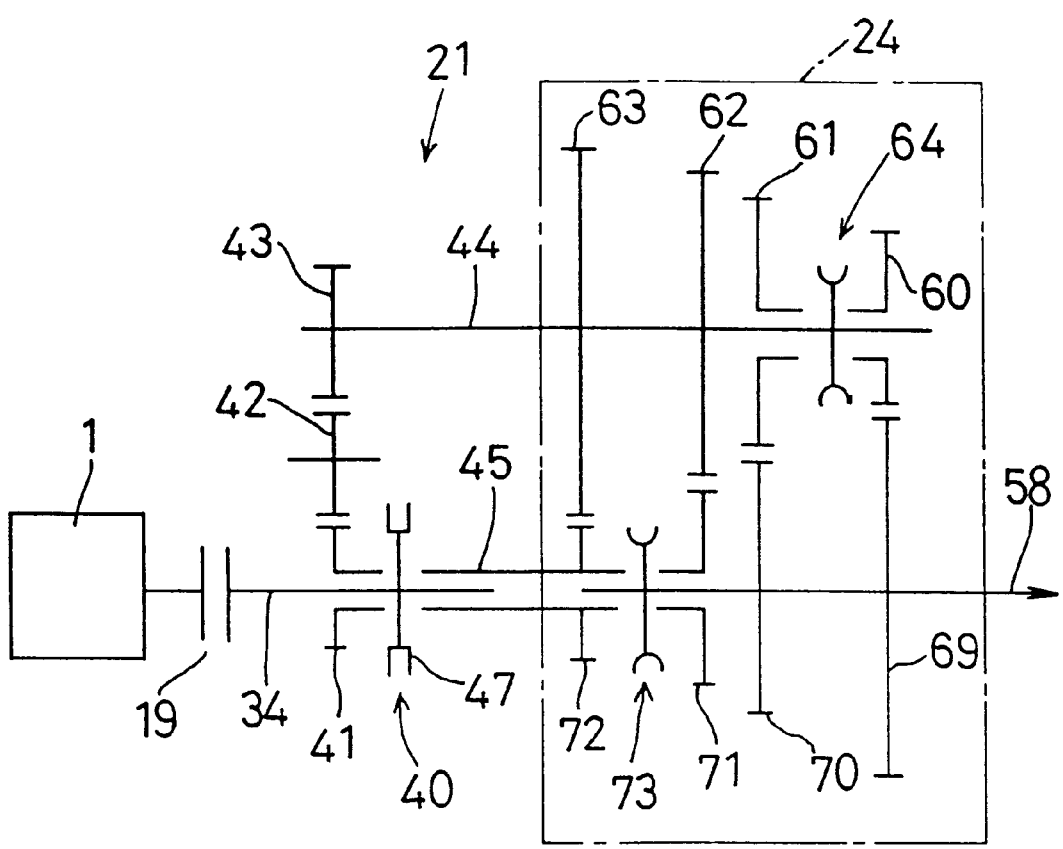
FIG. 7 is a schematic view of gears mounted in the change speed apparatus shown in FIG. 3.
Figure 8:
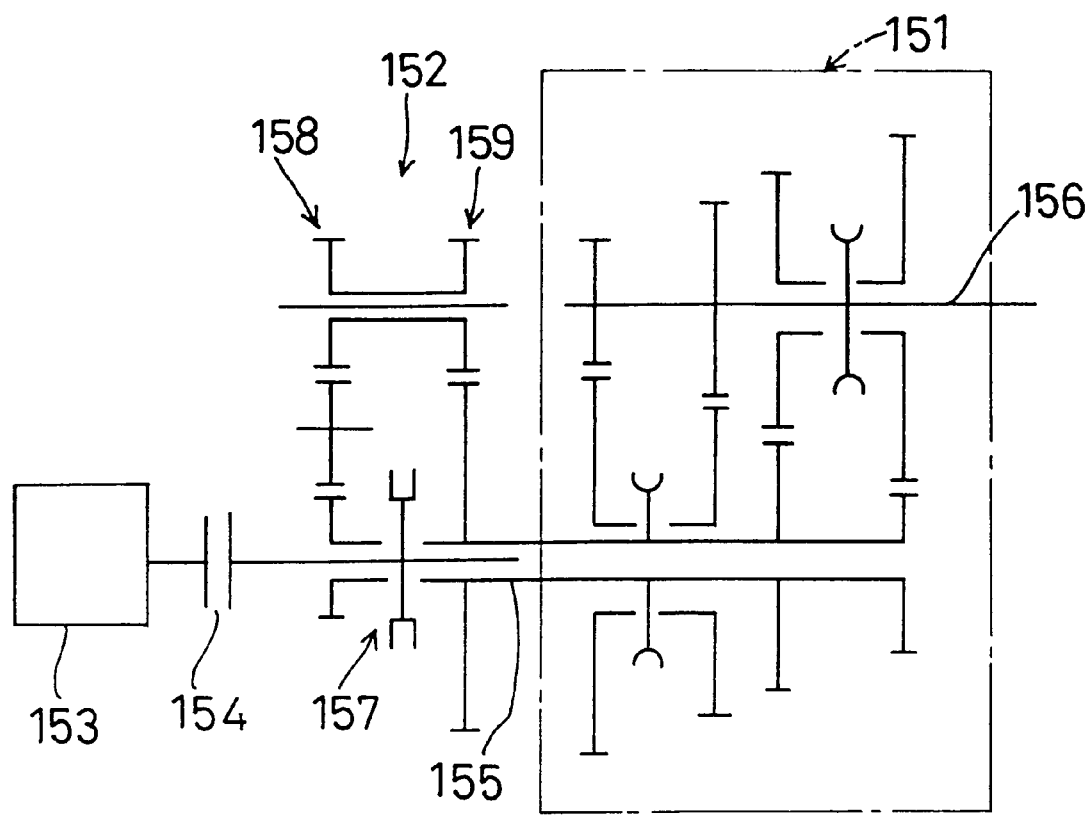
FIG. 8 is a schematic view of gears mounted in a conventional change speed apparatus.

FIG. 7 shows a schematic view of the gears of backward and forward drive switching device 21 and main change speed device 24 described above.

Figure 3:
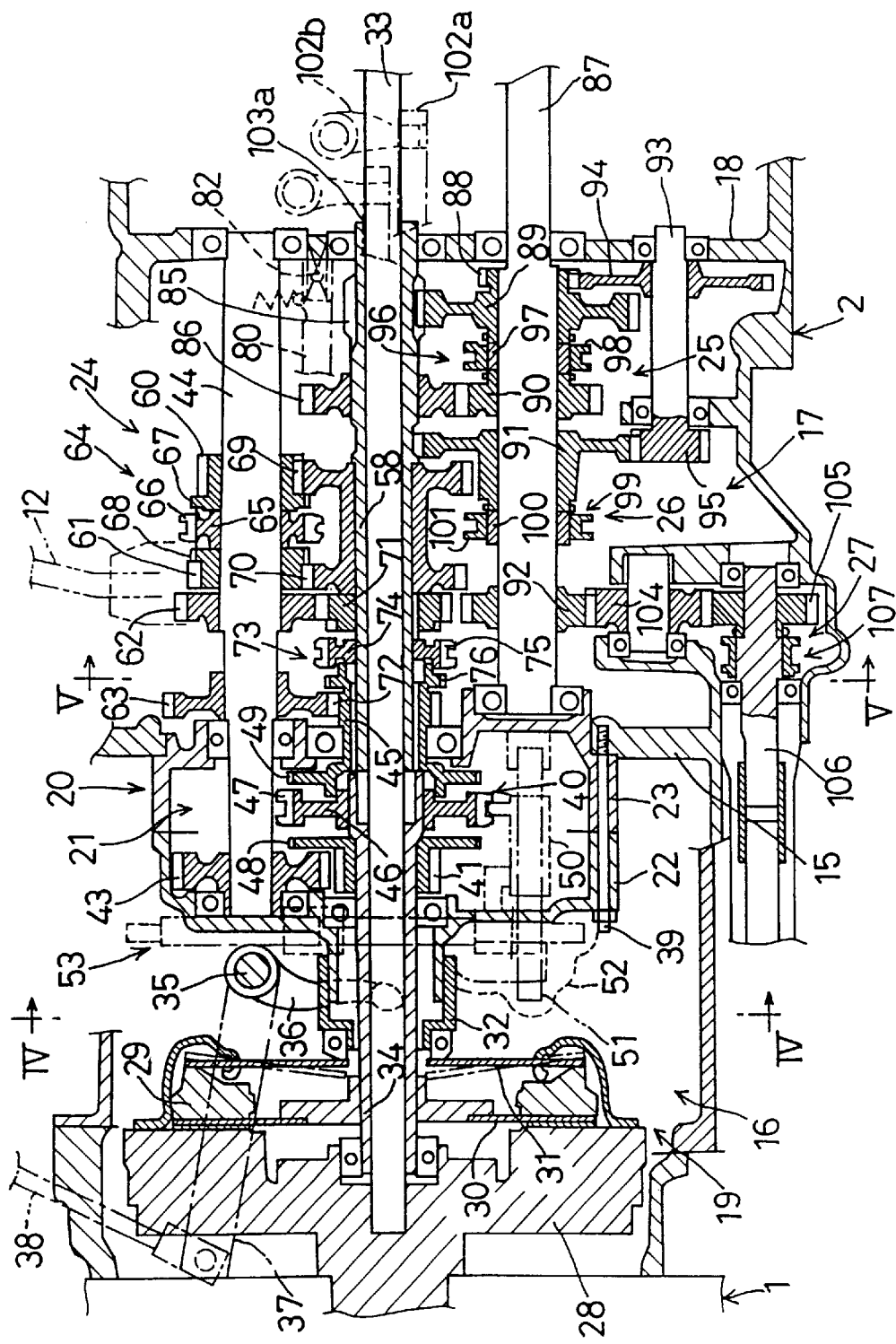
FIG. 3 is a sectional view of a change speed apparatus in one embodiment of this invention.
Figure 4:
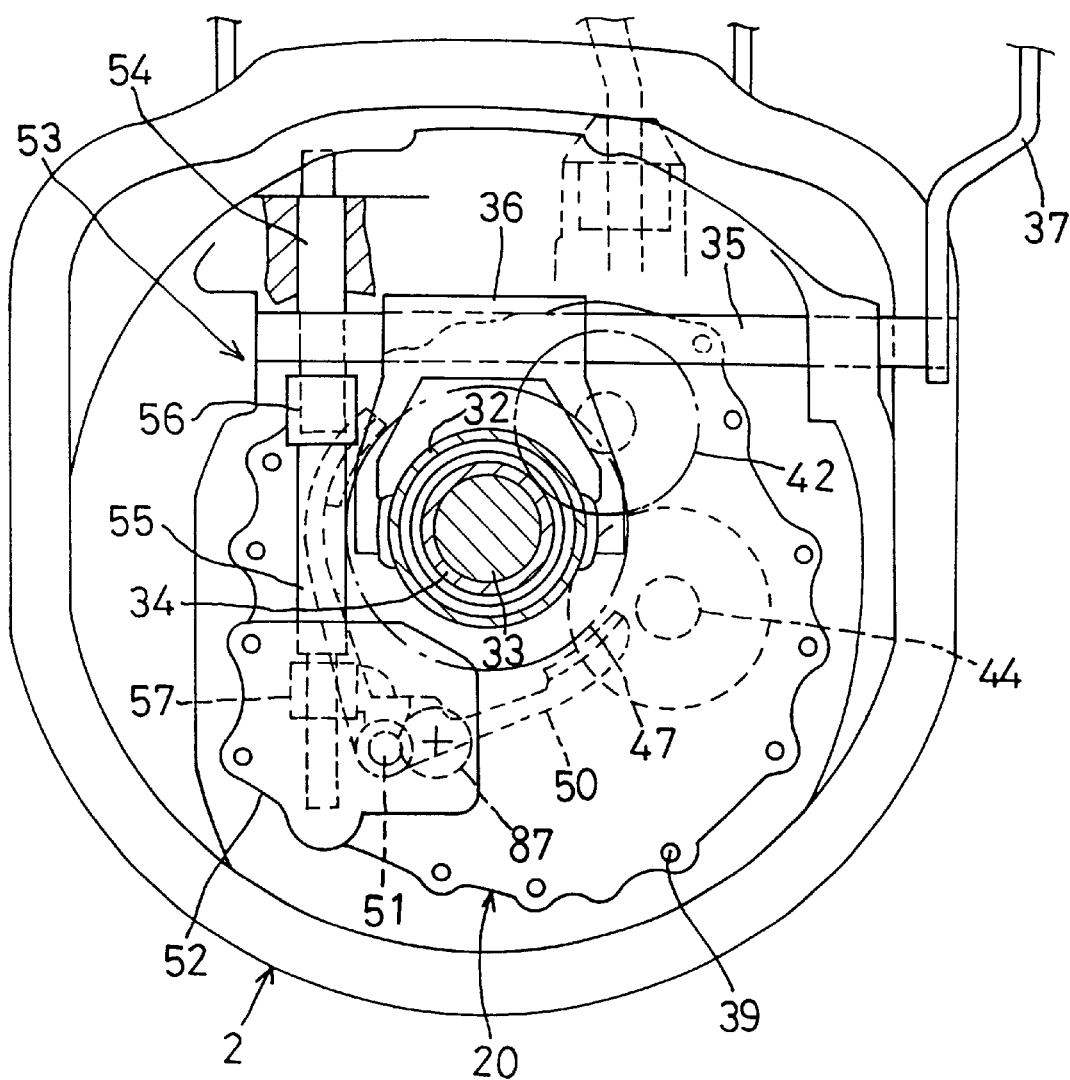
FIG. 4 is a sectional view taken on line IV—IV of FIG. 3.
Figure 5:
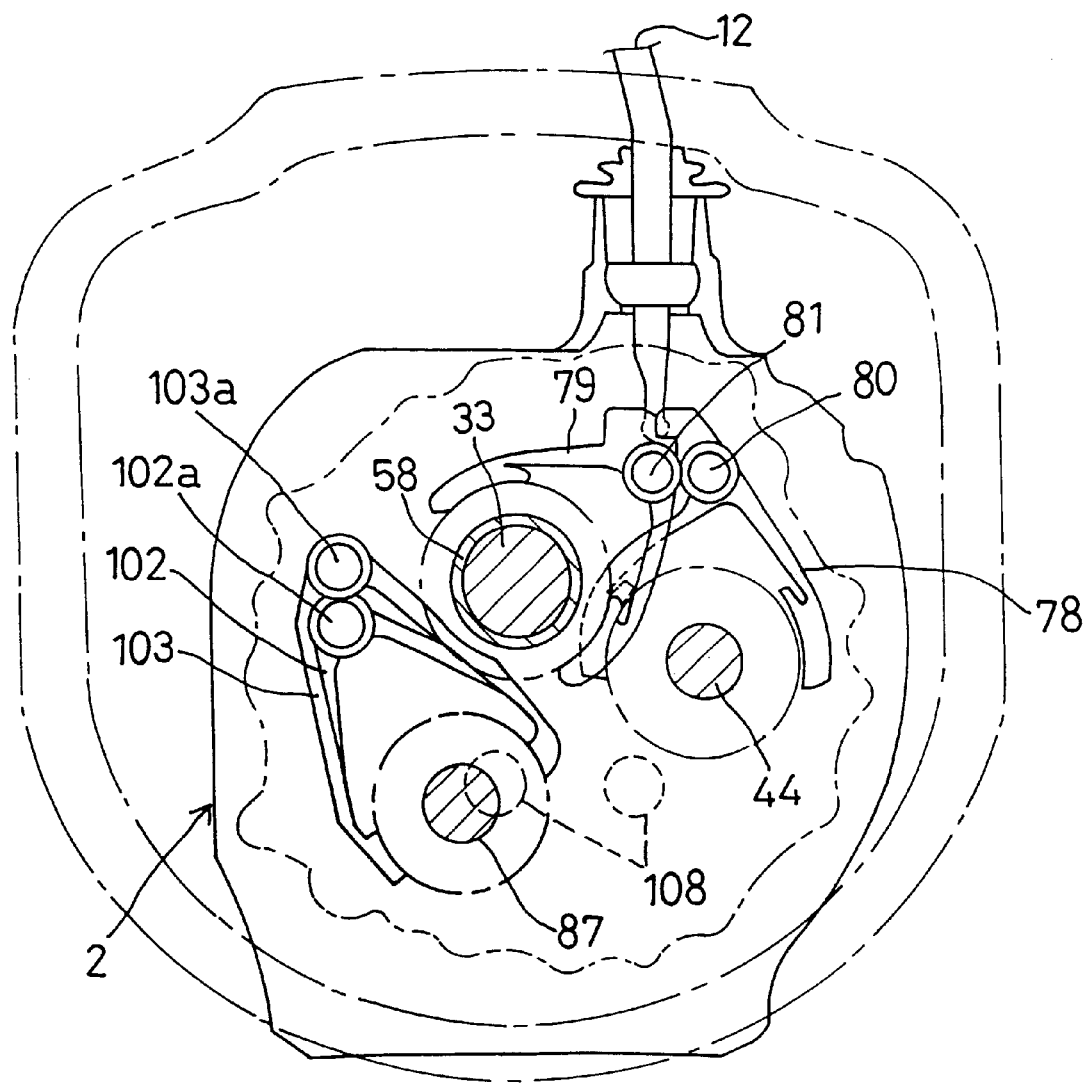
FIG. 5 is a sectional view taken on line V—V of FIG. 3.

As shown in FIGS. 3 and 5, the first and second speed switching shifter 66 and third and fourth speed switching shifter 75 are engaged with a first and second speed switching shift fork 78 and a third and fourth speed switching shift fork 79, respectively. The shift forks 78 and 79 are fixed, respectively, to a first and second speed switching shift rod 80 and a third and fourth speed switching shift rod 81 extending parallel to each other and on the same horizontal plane. The shift rods 80 and 81 are parallel to the PTO drive shaft 33. The front and rear ends of shift rods 80 and 81 are supported by the first and second partitions 15 and 18 of transmission cases 2. The lower end of main shift lever 12 is selectively engageable with the shift forks 78 and 79. The shift fork 78 or 79 engaged by the shift lever 12 is moved forward or rearward.

The first and second speed switching shifter 66 has an inside diameter larger than the outside diameter of first speed gear 60. Thus, the shifter 66, when shifted for the first speed, could move past the engaging portion 67 of first speed gear 60 (i.e. to be overshifted).

Figure 6:
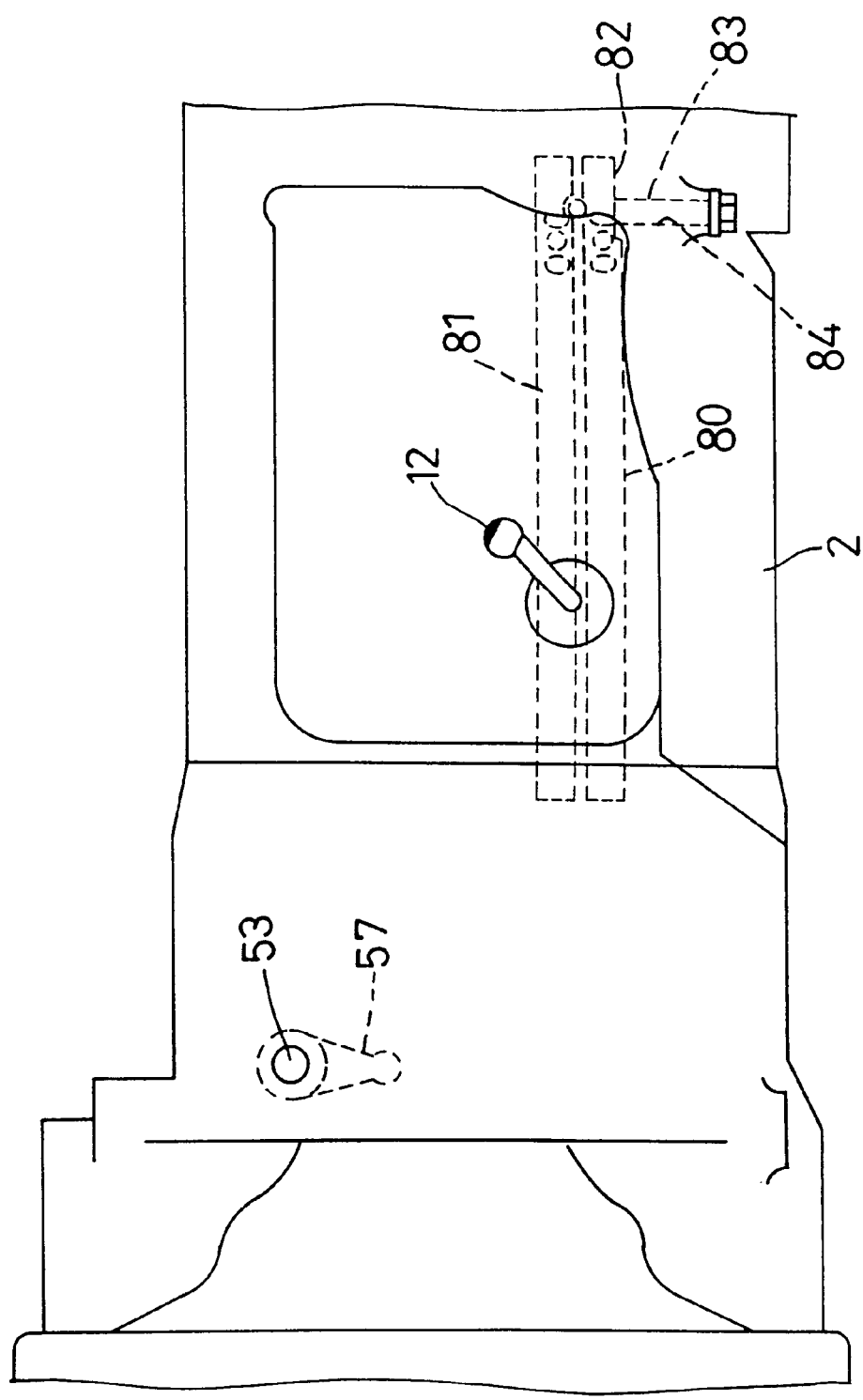
FIG. 6 is a plan view of a transmission case.

To prevent such an overshift of the first and second speed switching shifter 66, as shown in FIG. 6, the first and second speed switching shift rod 80 has a cutout 82 formed in an end region thereof, and a stopper pin 83 projects from the transmission case 2 for engaging a shoulder of the cutout 82. The stopper pin 83 is attached to the transmission case 2 as screwed into a ball receiving bore 84 formed to receive interlocking balls between the two shift rods 80 and 81.

The change speed output shaft 58 has, arranged from rear to front, a low speed gear 85 and a high speed gear 86 rotatable with the change speed output shaft 58.

The transmission case 2 has a propelling shaft 87 extending parallel to the change speed output shaft 58. The propelling shaft 87 is rotatably supported at a forward end thereof by the rear case 23 of gear case 20 through a bearing, and rotatably supported in an intermediate position by the second partition 18 through a bearing. The rear end of the propelling shaft 87 is connected to a rear differential not shown).

The propelling shaft 87 has, arranged from adjacent the second partition 18 to front, a superlow speed input gear 88, a low speed gear 89, a high speed gear 90 and a superlow speed output gear 91 which are rotatable relative to the propelling shaft 87. In addition, a front wheel drive gear 92 is fixed to the propelling shaft 87 forwardly of the above gears. The low speed gear 89 and high speed gear 90 on the propelling shaft 87 are in constant mesh with the low speed gear 85 and high speed gear 86 on the change speed output shaft 58, respectively. The superlow speed input gear 88 and low speed gear 89 on the propelling shaft 87 are twin gears.

The transmission case 2 further includes an intermediate shaft 93 supported to be rotatable through bearings and extending parallel to the propelling shaft 87. The intermediate shaft 93 has gears 94 and 95 mounted to be rotatable therewith and in constant mesh with the superlow speed input gear 88 and superlow speed output gear 91.

The propelling shaft 87 has a high and low speed switching clutch 96 mounted thereon between the low speed gear 89 and high speed gear 90. The high and low speed switching clutch 96 is a claw clutch having a hub 97 fixed to the propelling shaft 87, and a shifter 98 mounted on the hub 97 not to be rotatable but axially movable relative thereto. The low speed gear 89 and high speed gear 90 have engaging portions formed on inward ends thereof for engagement with the shifter 98.

The propelling shaft 87 has a superlow speed switching clutch 99 mounted thereon forwardly of the superlow speed output gear 91. The superlow speed switching clutch 99 is a claw clutch having a hub 100 fixed to the propelling shaft 87, and a shifter 101 mounted on the hub 100 not to be rotatable but axially movable relative thereto. The superlow speed output gear 91 has an engaging portion formed on an inward end thereof for engagement with the shifter 101.

As shown in FIGS. 3 and 5, the high and low speed switching shifter 98 and superlow speed switching shifter 101 are engaged with shift forks 102 and 103, respectively. The high and low speed switching shift fork 102 is fixed to a shift rod 102a. The shift rod 102a has a yoke 102b (FIG. 1) engaged with the rear end thereof and pivotable by the auxiliary shift lever 14 as shown in FIG. 5, whereby the shift fork 102 is moved fore and aft. The superlow speed switching fork 103 is fixed to a shift rod 103a. The rod 103a also is movable fore and aft by operating the control lever not shown.

The low speed gears 85 and 89, high speed gears 86 and 90 and high and low speed switching clutch 96 constitute the auxiliary change speed device 25. The superlow speed gears 88, 91, 94 and 95 and superlow speed switching clutch 99 constitute the creep change speed device 26.

The front wheel drive gear 92 is meshed with an output gear 105 through an intermediate gear 104. The output gear 105 is engageable with and disengageable from an output shaft 106 through a front wheel drive clutch 107. The output shaft 106 is connected at a forward end thereof to a front wheel driving differential not shown.

The front wheel drive gear 92 and front wheel drive clutch 107 constitute the front wheel driving device 27.

The lubricant stored in the transmission chamber 17 is picked up by the gears in rotation to lubricate the change speed devices in the transmission chamber 17. The lubricant is also sucked up by a hydraulic pump to be supplied as hydraulic oil to various actuators.

Returning hydraulic oil is supplied from a rearward position of change speed output shaft 58 to a gap between PTO drive shaft 33 and change speed output shaft 58. The oil flows forward to lubricate the synchromesh clutches and the like. Then, the oil flows out from the forward end of the change speed output shaft 58 to lubricate the backward and forward drive switching clutch 40, and is thereafter stored in the gear case 20.

As shown in FIG. 5, the rear case 23 of gear case 20 defines an oil communicating bore 108. Through the oil communicating bore 108, the oil in the gear case 20 returns to the transmission chamber 17. However, the oil communicating bore 108 is located in a higher position than the lubricant level in the transmission chamber 17. The lubricant level in the gear case 20 is always maintained higher than the lubricant level in the transmission chamber 17.

According to the embodiment having the above construction, the backward and forward drive switching device 21 no longer requires a backward return gear train as required in the prior art. Thus, the change speed apparatus a correspondingly reduced fore and aft length.

The change speed apparatus for a tractor according to this invention is not limited to the foregoing embodiment. The invention is applicable also to an engine power transmitting system with the backward and forward drive switching device disposed downstream, and not upstream, of the main change speed device.

According to this invention, the backward and forward drive switching device no longer requires a backward return gear train as required in the prior art. Thus, the change speed apparatus a correspondingly reduced fore and aft length. This construction provides for a reduction in the distance between the front and rear wheels, to achieve an improved small turn performance.

Further, since the backward and forward drive switching device may be sub-assembled in the gear case, an assembly operation may carried out with increased efficiency.

The backward and forward drive switching device has an operating shaft and a control lever disposed close to each other. This arrangement results in a simplified connecting mechanism between the shaft and lever.

What is claimed is:

1. A change speed apparatus for a tractor comprising:
   a main change speed device having a combination of gear trains mounted on a first shaft and a second shaft extending parallel to each other, for driving a change speed output shaft at a plurality of speeds; and
   a backward and forward drive switching device cooperable with said main change speed device to produce forward drive and backward drive in an equal number of speeds;
   wherein, between said main change speed device and said backward and forward drive switching device, said forward drive is transmitted through said first shaft and said backward drive is transmitted through said second shaft,
   wherein said backward and forward drive switching device and said main change speed device are disposed in a transmission case, said backward and forward drive switching device is pre-assembled in a gear case fixable to said transmission case; and
   wherein said transmission case is divided by a partition into a clutch chamber for housing a main clutch for connecting and disconnecting power from an engine, and a transmission chamber for housing said main change speed device, said gear case being disposed in said clutch chamber, said main clutch being operable by a release fork disposed between said main clutch and said gear case, said release fork being curved to bulge toward said main clutch.

2. A change speed apparatus as defined in claim 1, wherein said forward drive from said backward and forward drive switching device is inputted to said main change speed device through said first shaft, and said backward drive from said backward and forward drive switching device is inputted to said main change speed device through said second shaft.

3. A change speed apparatus as defined in claim 1, wherein said backward and forward drive switching device has a control lever thereof disposed on a steering wheel unit, said control lever being interlocked to said backward and forward drive switching device through an operating shaft extending vertically in said clutch chamber.

4. A change speed apparatus for a tractor comprising:
   a backward and forward drive switching device for switching power transmitted from an engine between forward drive and backward drive; and
   a main change speed device for receiving drive from said backward and forward drive switching device and producing an equal number of speeds for the forward drive and backward drive, said main change speed device including:
     a first shaft for receiving the forward drive from said backward and forward drive switching device;
     a second shaft for receiving the backward drive from said backward and forward drive switching device; and
     a change speed output shaft for outputting drive from said main change speed device, said change speed output shaft receiving the forward drive and backward drive in an equal number of speeds through a combination of gear trains mounted on said first shaft and gear trains mounted on said second shaft,
   wherein said backward and forward drive switching device and said main change speed device are disposed in a transmission case, said backward and forward drive switching device is pre-assembled in a gear case fixable to said transmission case; and
   wherein said transmission case is divided by a partition into a clutch chamber for housing a main clutch for connecting and disconnecting power from said engine, and a transmission chamber for housing said main change speed device, said gear case being disposed in said clutch chamber, said main clutch being operable by a release fork disposed between said main clutch and said gear case, said release fork being curved to bulge toward said main clutch.

5. A change speed apparatus as defined in claim 4, wherein said backward and forward drive switching device has a control lever thereof disposed on a steering wheel unit, said control lever being interlocked to said backward and forward drive switching device through an operating shaft extending vertically in said clutch chamber.

6. A change speed apparatus for a tractor comprising:
   a main change speed device including a first input shaft, a second input shaft extending parallel to said first input shaft, and a change speed output shaft, said main change speed device being adapted for producing forward drive and backward drive in an equal number of speeds from the drive received by said first input shaft and said second input shaft and outputting the forward drive and backward drive through said change speed output shaft; and
   a backward and forward drive switching device including a shuttle input shaft for receiving drive from an engine, and a backward and forward drive switching clutch shiftable at least between a first state in which the engine drive received by said shuttle input shaft is transmitted as the forward drive to said first input shaft, and a second state in which the engine drive received by said shuttle input shaft is transmitted as the backward drive to said second input shaft,
   wherein said backward and forward drive switching device and said main change speed device are disposed in a transmission case, and said transmission case is divided by a partition into a clutch chamber for housing a main clutch for connecting and disconnecting power from the engine, and a transmission chamber for housing said main change speed device, wherein said backward and forward drive switching device has a control lever thereof disposed on a steering wheel unit, and wherein said control lever is interlocked to said backward and forward drive switching device through an operating shaft extending vertically in said clutch chamber.

7. A change speed apparatus as defined in claim 6, wherein said backward and forward drive switching device is pre-assembled in a gear case fixable to said transmission case.

8. A change speed apparatus as defined in claim 7, wherein said gear case is disposed in said clutch chamber, with said main clutch operable by a release fork disposed between said main clutch and said gear case, and wherein said release fork is curved to bulge toward said main clutch.

* * * * *